United States Patent
Shibai et al.

(10) Patent No.: US 10,913,862 B2
(45) Date of Patent: *Feb. 9, 2021

(54) ANTIFOULING FILM

(71) Applicant: Sharp Kabushiki Kaisha, Sakai (JP)

(72) Inventors: Yasuhiro Shibai, Sakai (JP); Ken Atsumo, Sakai (JP); Kenichiro Nakamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,954

(22) PCT Filed: Jan. 23, 2018

(86) PCT No.: PCT/JP2018/001846
§ 371 (c)(1),
(2) Date: Jul. 23, 2019

(87) PCT Pub. No.: WO2018/139418
PCT Pub. Date: Aug. 2, 2018

(65) Prior Publication Data
US 2019/0338149 A1    Nov. 7, 2019

(30) Foreign Application Priority Data

Jan. 30, 2017    (JP) .................. 2017-014652

(51) Int. Cl.
*C09D 5/16*    (2006.01)
*C08F 232/06*    (2006.01)
(Continued)

(52) U.S. Cl.
CPC ............. *C09D 5/1668* (2013.01); *B32B 3/30* (2013.01); *B32B 27/30* (2013.01); *C08F 16/04* (2013.01);
(Continued)

(58) Field of Classification Search
CPC ...... C09D 5/1668; C09D 5/1681; C09D 5/18; C08F 232/06; C08F 220/56; C08F 16/04; C08F 290/00; B32B 27/30
(Continued)

(56) References Cited

U.S. PATENT DOCUMENTS

2012/0135196 A1* 5/2012 Sugasaki .................. B32B 3/30
                                                                    428/156
2014/0077418 A1* 3/2014 Otani ..................... B29C 59/046
                                                                    264/447
(Continued)

FOREIGN PATENT DOCUMENTS

JP    2009-73903 A    4/2009
JP    2009-221475 A    10/2009
(Continued)

OTHER PUBLICATIONS

Official Communication issued in International Patent Application No. PCT/JP2018/001846, dated Apr. 10, 2018.
(Continued)

*Primary Examiner* — Tahseen Khan
(74) *Attorney, Agent, or Firm* — Keating & Bennett, LLP

(57) ABSTRACT

The present invention provides an antifouling film that is excellent in antifouling properties, rubbing resistance, and adhesion. The antifouling film includes: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 30 to 80 wt % of a polyfunctional acrylate, 10 to 30 wt % of a monofunctional amide monomer, 0.5 to 10 wt % of a fluorine-based release
(Continued)

agent, and 5 to 30 wt % of a vinyl-based polymer containing a repeat unit represented by a predetermined formula.

9 Claims, 2 Drawing Sheets

(51) Int. Cl.
| | |
|---|---|
| *B32B 3/30* | (2006.01) |
| *B32B 27/30* | (2006.01) |
| *C08F 16/04* | (2006.01) |
| *C08F 220/56* | (2006.01) |
| *C08F 290/00* | (2006.01) |
| *C09D 5/18* | (2006.01) |
| *G02B 1/18* | (2015.01) |

(52) U.S. Cl.
CPC .......... *C08F 220/56* (2013.01); *C08F 232/06* (2013.01); *C08F 290/00* (2013.01); *C09D 5/1681* (2013.01); *C09D 5/18* (2013.01); *G02B 1/18* (2015.01)

(58) Field of Classification Search
USPC ........................................................ 524/544
See application file for complete search history.

(56) References Cited

U.S. PATENT DOCUMENTS

| | | | |
|---|---|---|---|
| 2016/0054478 A1* | 2/2016 | Otani | G02B 1/118 428/141 |
| 2016/0229095 A1* | 8/2016 | Mori | G02B 1/118 |
| 2018/0105645 A1* | 4/2018 | Takano | B01J 23/44 |
| 2019/0001612 A1 | 1/2019 | Hayashi et al. | |

FOREIGN PATENT DOCUMENTS

| | | | |
|---|---|---|---|
| JP | 2014-5341 A | 1/2014 | |
| WO | WO-2016159302 A1 * | 10/2016 | C07B 31/00 |
| WO | 2018/012342 A1 | 1/2018 | |
| WO | 2018/037711 A1 | 3/2018 | |

OTHER PUBLICATIONS

Shibai et al., "Decorative Film", U.S. Appl. No. 16/488,257, filed Aug. 23, 2019.

\* cited by examiner (a)

(b)

(c)

(d)

ANTIFOULING FILM

TECHNICAL FIELD

The present invention relates to antifouling films. The present invention more specifically relates to an antifouling film including an uneven structure of nanometer scale.

BACKGROUND ART

Various products formed from a curable resin composition, such as optical films, have been studied (e.g., Patent Literatures 1 to 3). In particular, optical films having an uneven structure of nanometer scale (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: JP 2014-5341 A
Patent Literature 2: JP 2009-73903 A
Patent Literature 3: JP 2009-221475 A

SUMMARY OF INVENTION

Technical Problem

Although such optical films have excellent antireflective properties, the uneven structure on the surface may cause easy spread of dirt such as fingerprints (sebaceous dirt) sticking thereon and further cause difficulty in wiping off such dirt present between projections. Such sticking dirt has a reflectance that is very different from the reflectance of the optical film, and thus is noticeable. This has increased the demand for functional films (antifouling films) including on their surface an uneven structure of nanometer scale and showing excellent ease of wiping off dirt (e.g., ease of wiping off fingerprints), i.e., excellent antifouling properties.

The present inventors made studies on such films, and found that an antifouling film increased in antifouling properties and other various properties can be achieved by devising the materials of the polymer layer constituting the uneven structure of the optical film. Specifically, using a fluorine-based release agent as a material of the polymer layer was found to increase the antifouling properties, and using a polyfunctional acrylate was found to increase the rubbing resistance. Also, increasing the crosslinking density of the polymer layer and decreasing the glass transition temperature thereof were found to significantly increase the rubbing resistance.

However, further studies made by the inventors found that the increase in rubbing resistance is limited because use of a polyfunctional acrylate increases the crosslinking density, but is unfortunately likely to increase the glass transition temperature as well. The studies also found that, since the fluorine-based release agent and the polyfunctional acrylate have low compatibility with each other, the desired antifouling properties and rubbing resistance are not likely to be achieved. Also, the adhesion between the polymer layer of the antifouling film and the substrate was found insufficient when the fluorine-based release agent and the polyfunctional acrylate were used in combination.

As described above, although the conventional antifouling films are desired to be higher in all the antifouling properties, rubbing resistance, and adhesion, no way to achieve such higher properties has been found. For example, the inventions described in Patent Literatures 1 to 3 fail to increase the antifouling properties, rubbing resistance, and adhesion at the same time, and thus can still be improved.

In response to the above issues, an object of the present invention is to provide an antifouling film that is excellent in antifouling properties, rubbing resistance, and adhesion.

Solution to Problem

The inventors made various studies on an antifouling film that is excellent in antifouling properties, rubbing resistance, and adhesion. The inventors then found use of a monofunctional amide monomer and a vinyl-based polymer having a given structure at a predetermined ratio as well as the polyfunctional acrylate and the fluorine-based release agent, as materials of the polymer layer. Thereby, the inventors successfully achieved the above object, arriving at the present invention.

In other words, one aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 30 to 80 wt % of a polyfunctional acrylate, 10 to 30 wt % of a monofunctional amide monomer, 0.5 to 10 wt % of a fluorine-based release agent, and 5 to 30 wt % of a vinyl-based polymer containing a repeat unit represented by the following formula (1):

[Chem. 1]

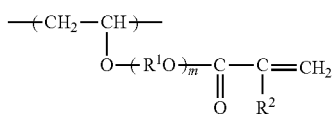

(1)

wherein $R^1$ is a C2-C8 alkylene group, $R^2$ is a hydrogen atom or a methyl group, and m is a positive integer.

The vinyl-based polymer may include a polyfunctional polymer containing 50 or more acryloyl groups per molecule.

The polyfunctional polymer may be a cationic polymer of 2-(2-vinyloxyethoxy)ethyl acrylate.

The fluorine-based release agent may contain a perfluoropolyether group.

The monofunctional amide monomer may include N,N-dimethylacrylamide.

The polymer layer may have a surface that shows a contact angle of 130° or greater with water and a contact angle of 30° or greater with hexadecane.

The polymer layer may have a thickness of 5.0 μm or greater and 20.0 μm or smaller.

The projections may be formed at an average pitch of 100 nm or longer and 400 nm or shorter.

The projections may have an average height of 50 nm or greater and 600 nm or smaller.

The projections may have an average aspect ratio of 0.8 or greater and 1.5 or smaller.

Advantageous Effects of Invention

The present invention can provide an antifouling film that is excellent in antifouling properties, rubbing resistance, and adhesion.

DESCRIPTION OF EMBODIMENTS

The present invention is described in more detail based on the following embodiment with reference to the drawings. The embodiment, however, is not intended to limit the scope of the present invention. The configurations of the embodiment may appropriately be combined or modified within the spirit of the present invention.

The expression "X to Y" as used herein means "X or more and Y or less".

Embodiment

Figure 1:
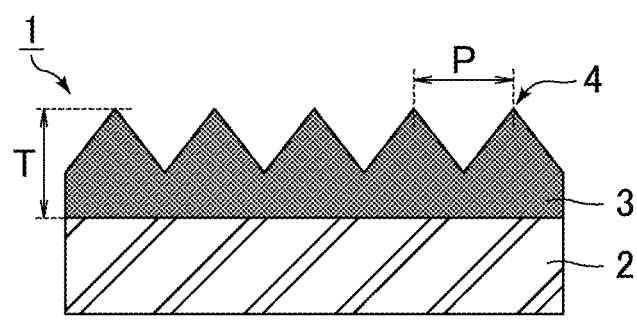
FIG. 1 is a schematic cross-sectional view of an antifouling film of an embodiment.
Figure 2:
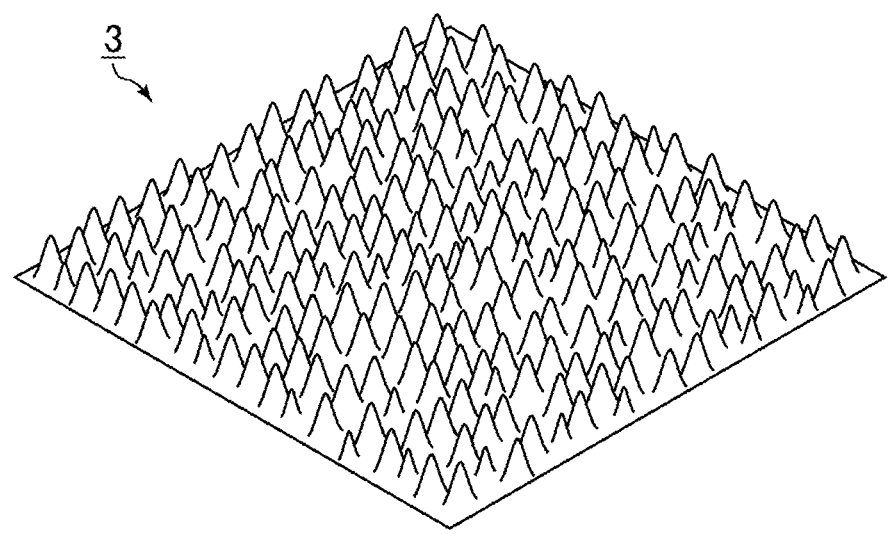
FIG. 2 is a schematic plan view of a polymer layer in FIG. 1.

An antifouling film of an embodiment is described below with reference to FIG. 1 and FIG. 2. FIG. 1 is a schematic cross-sectional view of the antifouling film of the embodiment. FIG. 2 is a schematic plan view of a polymer layer in FIG. 1.

An antifouling film 1 includes a substrate 2 and a polymer layer 3 disposed on a surface of the substrate 2.

The material of the substrate 2 may be, for example, a resin such as triacetyl cellulose (TAC), polyethylene terephthalate (PET), or methyl methacrylate (MMA). The substrate 2 may appropriately further contain an additive such as a plasticizer in addition to the above material. One surface (the surface close to the polymer layer 3) of the substrate 2 may have undergone easy adhesion treatment. For example, a triacetyl cellulose film with easy adhesion treatment may be used. One surface (the surface close to the polymer layer 3) of the substrate 2 may have undergone saponification treatment. For example, a saponified triacetyl cellulose film may be used. When the antifouling film 1 is attached to a display device provided with a polarizing plate such as a liquid crystal display device, the substrate 2 may be part of the polarizing plate.

The substrate 2 preferably has a thickness of 50 μm or greater and 100 μm or smaller in order to ensure the transparency and processability.

The polymer layer 3 includes on a surface thereof an uneven structure on which multiple projections (protrusions) 4 are disposed with a pitch (distance between the apexes of adjacent projections 4) P not longer than the wavelength (780 nm) of visible light, i.e., a moth-eye structure (a structure like a moth's eye). Thus, an antifouling film 1 can exert excellent antireflective properties (low reflectivity) owing to the moth-eye structure.

The polymer layer 3 preferably has a small thickness T for distribution of fluorine atoms in the later-described fluorine-based release agent at a high concentration on the surface (the surface remote from the substrate 2) of the polymer layer 3. Specifically, the polymer layer 3 has a thickness T of 5.0 μm or greater and 20.0 μm or smaller, more preferably 8.0 μm or greater and 12.0 μm or smaller. The thickness T of the polymer layer 3 indicates, as shown in FIG. 1, the distance from the surface close to the substrate 2 to the apex of a projection 4.

Examples of the shape of the projections 4 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 4 are inclined, but the bases may not be inclined but may be flat.

The projections 4 are preferably formed at an average pitch of 100 nm or longer and 400 nm or shorter, more preferably 100 nm or longer and 200 nm or shorter, for sufficient prevention of optical phenomena such as moiré and iridescence. The average pitch of the projections 4 specifically means the average pitch of all the adjacent projections within a 1-μm-square region in a plan image taken by a scanning electron microscope.

The projections 4 preferably have an average height of 50 nm or greater and 600 nm or smaller, more preferably 100 nm or greater and 300 nm or smaller, for simultaneous achievement of the preferred average height and the later-described preferred average aspect ratio of the projections 4. The average height of the projections 4 specifically means the average value of the heights of 10 consecutive projections in a cross-sectional image taken by a scanning electron microscope. These 10 projections were selected so as not to include projections having any defect or deformed portion (e.g., a portion accidentally deformed during preparation of a measurement sample).

The projections 4 preferably have an average aspect ratio of 0.8 or greater and 1.5 or smaller, more preferably 1.0 or greater and 1.3 or smaller. If the average aspect ratio of the projections 4 is smaller than 0.8, the film may insufficiently prevent occurrence of optical phenomena such as moiré and iridescence, possibly failing to achieve good antireflective properties. If the average aspect ratio of the projections 4 is greater than 1.5, the processability of the uneven structure may be poor, sticking may occur, and transferring conditions in formation of the uneven structure may be poor (e.g., clogging of the die 6, twining of the material). The average aspect ratio of the projections 4 as used herein means the ratio of the average height of the projections 4 and the average pitch of the projections 4 (height/pitch).

The projections 4 may be arranged either randomly or regularly (periodically). The projections 4 may be arranged with periodicity. Yet, in terms of advantages such as no generation of diffracted light due to the periodicity, the projections 4 are preferably arranged with no periodicity (arranged randomly) as shown in FIG. 2.

The polymer layer 3 is a cured product of a polymerizable composition. Examples of the polymer layer 3 include a cured product of active energy ray-curable polymerizable composition and a cured product of a thermosetting polymerizable composition. The active energy rays mean ultraviolet rays, visible light, infrared rays, or plasma, for example. The polymer layer 3 is preferably a cured product of an active energy ray-curable polymerizable composition, more preferably a cured product of an ultraviolet ray-curable polymerizable composition.

The polymerizable composition contains, in terms of active components, 30 to 80 wt % of a polyfunctional acrylate (hereinafter, also referred to as Component A), 10 to 30 wt % of a monofunctional amide monomer (hereinafter, also referred to as Component B), 0.5 to 10 wt % of a fluorine-based release agent (hereinafter, also referred to as Component C), and 5 to 30 wt % of a vinyl-based polymer containing a repeat unit represented by the following formula (1) (hereinafter, also referred to as Component D).

[Chem. 2]

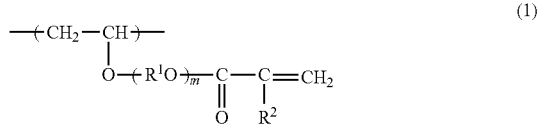

(1)

In the formula (1), $R^1$ is a C2-C8 alkylene group, $R^2$ is a hydrogen atom or a methyl group, and m is a positive integer.

The active components (active components of Components A to D) of the polymerizable composition refer to those constituting the polymer layer 3 after curing, excluding those not contributing to the curing reaction (polymerization reaction) (e.g., solvent).

The polymerizable composition, containing the above proportions of Components A to D, may also contain other component(s).

Components A to D are described below.

Component A

Component A increases the crosslinking density of the polymer layer 3 and provides an appropriate hardness (elasticity) to the polymer layer 3, increasing the rubbing resistance. However, the increase in rubbing resistance is limited because use of Component A increases the crosslinking density of the polymer layer 3, but is unfortunately likely to increase the glass transition temperature as well. Meanwhile, the present embodiment increases the rubbing resistance significantly because it further utilizes the later-described Component D, which can decrease the glass transition temperature while increasing the crosslinking density of the polymer layer 3. Here, Component A (polyfunctional acrylate) refers to an acrylate containing two or more acryloyl groups per molecule.

The polymerizable composition has a Component A content, in terms of active components, of 30 to 80 wt %, preferably 35 to 80 wt %, more preferably 40 to 75 wt %. When the Component A content in terms of active components is lower than 30 wt %, the polymer layer 3 has insufficient elasticity (high glass transition temperature) and thus decreases the rubbing resistance. When the Component A content in terms of active components is higher than 80 wt %, the polymer layer 3 has significantly low crosslinking density and thus decreases the rubbing resistance. In the case where the polymerizable composition contains a plurality of Components A, the total of the Component A contents in terms of active components should fall within the above range.

The number of functional groups of Component A is 2 or more, preferably 3 or more, more preferably 4 or more. If the number of functional groups of Component A is very small, the crosslinking density of the polymer layer 3 may not be increased and thus the hardness may be significantly low, so that the rubbing resistance may not be easily increased. If the number of functional groups of Component A is very large, the crosslinking density of the polymer layer 3 may be significantly high and thus the elasticity thereof may be insufficient, so that the rubbing resistance may not be easily increased. From this viewpoint, the upper limit of the number of functional groups of Component A is preferably 10. The number of functional groups of Component A refers to the number of acryloyl groups per molecule.

Component A preferably contains an ethylene oxide group. With such Component A, the high polarity of the ethylene oxide group increases the interaction between the polymer layer 3 and the substrate 2, increasing the adhesion. Also, as described above, the rubbing resistance is considered to correlate with the crosslinking density and glass transition temperature of the polymer layer 3. Increasing the crosslinking density and decreasing the glass transition temperature therefore can significantly increase the rubbing resistance. For example, a polymerizable composition containing a polyfunctional acrylate containing a propylene oxide group unfortunately has a higher glass transition temperature than a polymerizable composition containing a polyfunctional acrylate containing an ethylene oxide group. This is because the branched —$CH_3$ in the propylene oxide group restricts the molecular motion. Also, propylene oxide groups (and hydrocarbon groups) have lower polarity than ethylene oxide groups, and thus decrease the interaction between the polymer layer 3 and the substrate 2, which decreases the adhesion. Hence, the present embodiment preferably utilizes a polyfunctional acrylate containing an ethylene oxide group from the viewpoints of rubbing resistance and adhesion.

In the case where Component A contains an ethylene oxide group, the number of ethylene oxide groups is preferably 1 to 15 per functional group, more preferably 2 to 12 per functional group, still more preferably 4 to 9 per functional group. With the number of ethylene oxide groups per functional group falling within the above range, the rubbing resistance is further increased. The number of ethylene oxide groups per functional group refers to the ratio (number of ethylene oxide groups per molecule)/(number of acryloyl groups per molecule).

Examples of Component A include urethane acrylate, trimethylolpropane triacrylate, dipentaerythritol hexaacrylate, polyethylene glycol diacrylate, polypropylene glycol diacrylate, propoxylated trimethylolpropane triacrylate, propoxylated pentaerythritol tri- and tetra-acrylates, and alkoxylated dipentaerythritol polyacrylate. Known examples of the urethane acrylate include "U-10HA" (the number of functional groups: 10, ethylene oxide group: not contained) from Shin Nakamura Chemical Co., Ltd. Known examples of the trimethylolpropane triacrylate include "NK Ester A-TMPT" (the number of functional groups: 3, ethylene oxide group: not contained) from Shin Nakamura Chemical Co., Ltd. Known examples of the dipentaerythritol hexaacrylate include "NK Ester A-DPH" (the number of functional groups: 6, ethylene oxide group: not contained) from Shin Nakamura Chemical Co., Ltd. Known examples of the polyethylene glycol diacrylate include "NK Ester A-400" (the number of functional groups: 2, the number of ethylene oxide groups: 4.5 per functional group) from Shin Nakamura Chemical Co., Ltd. Known examples of the polypropylene glycol diacrylate include "NK Ester APG-400" (the number of functional groups: 2, ethylene oxide group: not contained) from Shin Nakamura Chemical Co., Ltd. Known examples of the propoxylated trimethylolpropane triacrylate include "NK Ester A-TMPT-3PO" (the number of functional groups: 3, ethylene oxide group: not contained) from Shin Nakamura Chemical Co., Ltd. Known examples of the propoxylated pentaerythritol tri- and tetra-acrylates include "NK Ester ATM-4PL" (the number of functional groups: 4, ethylene oxide group: not contained)

from Shin Nakamura Chemical Co., Ltd. Known examples of the alkoxylated dipentaerythritol polyacrylate include "KAYARAD® DPCA-60" (the number of functional groups: 6, ethylene oxide group: not contained) from Nippon Kayaku Co., Ltd.

Component B

Component B increases the compatibility between Components A, C, and D, increasing the rubbing resistance. Also, Component B reduces cure shrinkage of the polymerizable composition and increases the cohesive force between the polymer layer 3 and the substrate 2, increasing the adhesion between them. Components A and D have high molecular weights and thus have low compatibility with each other. Component C may have a long-chain structure, and therefore may have low compatibility with Components A and D. Thus, Component B not only increases the cohesive force between the polymer layer 3 and the substrate 2 but also functions as a reactive diluent (compatibilizer) for Components A, C, and D. Component B (monofunctional amide monomer) refers to a monomer that contains an amide group and contains one acryloyl group per molecule.

The polymerizable composition has a Component B content, in terms of active components, of 10 to 30 wt %, preferably 12.5 to 27.5 wt %, more preferably 15 to 25 wt %. In other words, an amide group content of Component B is 1.0 to 3.0 mmol/g, preferably 1.25 to 2.75 mmol/g, more preferably 1.5 to 2.5 mmol/g in the polymerizable composition. When the Component B content in terms of active components is lower than 10 wt %, the smoothness is decreased, so that the rubbing resistance is decreased. Also, the cure shrinkage of the polymerizable composition is not reduced, and thus the adhesion is decreased. Also, Component C is likely to be insolubilized and thus fluorine atoms are not distributed uniformly on the surface (the surface remote from the substrate 2) of the polymer layer 3, so that the antifouling properties are deteriorated. When the Component B content in terms of active components is higher than 30 wt %, the polymer layer 3 has significantly low crosslinking density (significantly high glass transition temperature) and thus decreases the rubbing resistance. In the case where the polymerizable composition contains a plurality of Components B, the total of the Component B contents in terms of active components should fall within the above range.

Examples of Component B include N,N-dimethylacrylamide, N-acryloylmorpholine, N,N-diethylacrylamide, N-(2-hydroxyethyl)acrylamide, diacetone acrylamide, and N-n-butoxymethylacrylamide. Known examples of N,N-dimethylacrylamide include "DMAA®" from KJ Chemicals Corp. Known examples of N-acryloylmorpholine include "ACMO®" from KJ Chemicals Corp. Known examples of N,N-diethylacrylamide include "DEAR®" from KJ Chemicals Corp.

Known examples of N-(2-hydroxyethyl)acrylamide include "HEAR®" from KJ Chemicals Corp. Known examples of diacetone acrylamide include "DRAM®" from Nippon Kasei Chemical Co., Ltd. Known examples of N-n-butoxymethylacrylamide include "NBMA" from MCC Unitec Co., Ltd.

Component B preferably includes N,N-dimethylacrylamide. Component B including N,N-dimethylacrylamide has low viscosity and further increases the compatibility between Components A, C, and D. Also, such Component B increases the adhesion even when the substrate 2 is a triacetyl cellulose film.

Component C

Component C distributes fluorine atoms on the surface (the surface remote from the substrate 2) of the polymer layer 3 to lower the surface free energy of the polymer layer 3, increasing the antifouling properties. Component C also increases the smoothness, and thereby increases the rubbing resistance. Component C (fluorine-based release agent) refers to one containing, as an active component, a compound containing a fluorine atom in a molecule.

The polymerizable composition has a Component C content, in terms of active components, of 0.5 to 10 wt %, preferably 1 to 5 wt %, more preferably 1.5 to 3 wt %. When the Component C content in terms of active components is lower than 0.5 wt %, the amount of fluorine atoms distributed on the surface (the surface remote from the substrate 2) of the polymer layer 3 is significantly small, and thus the antifouling properties are deteriorated. Also, the smoothness is decreased, so that the rubbing resistance is decreased. When the Component C content in terms of active components is higher than 10 wt %, the compatibility between Components A, B, and D is significantly low, and thus fluorine atoms are not uniformly distributed on the surface (the surface remote from the substrate 2) of the polymer layer 3, so that the antifouling properties and the rubbing resistance are decreased. Also, bleed-out is likely to occur in a high temperature/high humidity environment, so that the optical properties (reliability) are deteriorated. In the case where the polymerizable composition contains a plurality of Components C, the total of the Component C contents in terms of active components should fall within the above range.

Component C may contain a perfluoropolyether group or a perfluoroalkyl group, but preferably contains a perfluoropolyether group. A release agent containing a perfluoropolyether group has better antifouling properties and rubbing resistance than a release agent containing no perfluoropolyether group (e.g., release agent containing a perfluoroalkyl group, silicone-based release agent).

Known examples of Component C include "Fomblin® MT70" and "Fomblin® AD1700" from Solvay, "Optool® DAC" and "Optool DAC-HP" from Daikin Industries, Ltd., and "Megaface® RS-76-NS" from DIC Corp.

Component D

Component D is a vinyl-based polymer containing a repeat unit represented by the following formula (1).

[Chem. 3]

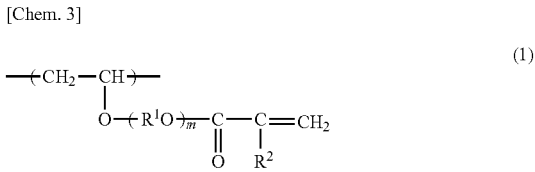

(1)

In the above formula (1), $R^1$ is a C2-C8 alkylene group, $R^2$ is a hydrogen atom or a methyl group, and m is a positive integer.

In a polyfunctional acrylate (e.g., Component A), some acryloyl groups may not undergo the polymerization reaction due to factors such as steric hindrance. Thus, the crosslinking density tends to increase as the number of functional groups (the number of acryloyl groups per molecule) increases. In contrast, Component D is insusceptible to the factors such as steric hindrance in the polymerization reaction and is therefore likely to increase the crosslinking density since it contains a C2-C8 alkylene group ($R^1$) as its repeat unit. Moreover, the C2-C8 alkylene group ($R^1$), having a flexible structure, is likely to give a low glass transition temperature. Hence, Component D can decrease the glass transition temperature while increasing the crosslinking density of the polymer layer 3, thereby significantly increasing the rubbing resistance. As described above, Component A can also increase the rubbing resistance to some extent, but is likely to increase not only the crosslinking density of the polymer layer 3 but also the glass transition temperature thereof, placing a limit on the increase in rubbing resistance. In contrast, the present embodiment utilizes Component A and Component D in combination, achieving the polymer layer 3 (antifouling film 1) that has a high crosslinking density and a low glass transition temperature, i.e., that has significantly good rubbing resistance.

In the above formula (1), $R^1$ is a C2-C8 alkylene group. Specific examples thereof include ethylene, trimethylene, propylene, tetramethylene, pentamethylene, hexamethylene, heptamethylene, octamethylene, cyclohexylene, 1,4-dimethylcyclohexane-α,α'-diyl, 1,3-dimethylcyclohexane-α,α'-diyl, 1,2-dimethylcyclohexane-α,α'-diyl, 1,4-dimethylphenyl-α,α'-diyl, 1,3-dimethylphenyl-α,α'-diyl, and 1,2-dimethylphenyl-α,α'-diyl groups. In particular, from the viewpoint of rubbing resistance, $R^1$ is preferably an ethylene or propylene group, more preferably an ethylene group. In the above formula (1), m $R^1$s are independent of each other, and may be the same as or different from each other, for example.

In the above formula (1), $R^2$ is a hydrogen atom or a methyl group, and is preferably a hydrogen atom from the viewpoint of rubbing resistance. The glass transition temperature is lower when $R^2$ is a hydrogen atom than when $R^2$ is a methyl group.

In the above formula (1), m is a positive integer, and is preferably an integer of 1 to 4, more preferably an integer of 2 or 3, from the viewpoint of rubbing resistance.

The polymerizable composition has a Component D content, in terms of active components, of 5 to 30 wt %, preferably 7.5 to 27.5 wt %, more preferably 10 to 25 wt %. When the Component D content in terms of active components is lower than 5 wt %, the crosslinking density of the polymer layer 3 is not increased (glass transition temperature is not decreased), so that the rubbing resistance is decreased. When the Component D content in terms of active components is higher than 30 wt %, the crosslinking density of the polymer layer 3 is significantly high and thus the elasticity thereof is insufficient, so that the rubbing resistance is decreased. Also, Component C is likely to be insolubilized and thus fluorine atoms are not distributed uniformly on the surface (the surface remote from the substrate 2) of the polymer layer 3, so that the antifouling properties are deteriorated. Furthermore, insolubilization of Component C tends to cause the resulting film to cause bleed-out in a high temperature/high humidity environment, deteriorating the optical properties (reliability). In the case where the polymerizable composition contains a plurality of Components D, the total of the Component D contents in terms of active components should fall within the above range.

The number of functional groups of Component D is preferably 50 or more, more preferably 60 or more, still more preferably 70 or more. If the number of functional groups of Component D is very small, the crosslinking density of the polymer layer 3 may not be increased and thus the hardness may be significantly low, so that the rubbing resistance may not be easily increased. If the number of functional groups of Component D is very large, the crosslinking density of the polymer layer 3 may be significantly high and thus the elasticity thereof may be insufficient, so that the rubbing resistance may not be easily increased. From this viewpoint, the upper limit of the number of functional groups of Component D is preferably 100. The number of functional groups of Component D refers to the number of (meth)acryloyl groups per molecule. The (meth)acryloyl group means an acryloyl group or a methacryloyl group.

The weight average molecular weight of Component D is preferably 5000 to 100000, more preferably 10000 to 50000. If the weight average molecular weight of Component D is very small, the crosslinking density of the polymer layer 3 may not be increased and thus the hardness thereof may be significantly low, so that the rubbing resistance may not be easily increased. If the weight average molecular weight of Component D is very large, the compatibility with Components A, B, and C may be low.

The (meth)acrylic equivalent of Component D is preferably 150 to 250, more preferably 180 to 220. If the (meth)acrylic equivalent of Component D is very small, the crosslinking density of the polymer layer 3 may be significantly high and thus the elasticity thereof may be insufficient, so that the rubbing resistance may not be easily increased. If the (meth)acrylic equivalent of Component D is very large, the crosslinking density of the polymer layer 3 may not be increased and thus the hardness thereof may be significantly low, so that the rubbing resistance may not be easily increased. The (meth)acrylic equivalent refers to the molecular weight per (meth)acryloyl group.

The glass transition temperature of Component D is preferably 0° C. to 150° C., more preferably 50° C. to 100° C., from the viewpoint of rubbing resistance. The glass transition temperature refers to a temperature corresponding to the peak value in a graph showing the temperature dependence of tan δ=E"/E' (E': storage modulus, E": loss modulus).

Component D can be obtained by, for example, selectively cationically polymerizing a vinyl ether group alone in a hybrid monomer in which the vinyl ether group and a (meth)acryloyl group coexist in a molecule. Examples of such a hybrid monomer include 2-(2-vinyloxyethoxy)ethyl (meth)acrylate, 2-vinyloxyethyl (meth)acrylate, 3-vinyloxypropyl (meth)acrylate, 2-vinyloxypropyl (meth)acrylate, 1-vinyloxypropyl (meth)acrylate, 1-methyl-2-vinyloxyethyl (meth)acrylate, 4-vinyloxybutyl (meth)acrylate, 3-vinyloxybutyl (meth)acrylate, 2-vinyloxybutyl (meth)acrylate, 1-methyl-3-vinyloxypropyl (meth)acrylate, 2-methyl-3-vinyloxypropyl (meth)acrylate, 1-methyl-2-vinyloxypropyl (meth)acrylate, 1,1-dimethyl-2-vinyloxyethyl (meth)acrylate, 6-vinyloxyhexyl (meth)acrylate, 4-vinyloxycyclohexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, 4-vinyloxymethylphenylmethyl (meth)acrylate, 3-vinyloxymethylphenylmethyl (meth)acrylate, 2-vinyloxymethylphenylmethyl (meth)acrylate, 2-(2-vinyloxyisopropoxy)ethyl (meth)acrylate, 2-(2-vinyloxyethoxy) propyl (meth)acrylate, 2-(2-vinyloxyisopropoxy)propyl (meth)acrylate, 2-(2-vinyloxyethoxy)isopropyl (meth)acrylate, 2-(2-vinyloxyisopropoxy)isopropyl (meth)acrylate, 2-{2-(2-vinyloxyethoxy)ethoxy}ethyl (meth)acrylate, 2-{2-(2-vinyloxyisopropoxy)ethoxy}ethyl (meth)acrylate, 2-{2-(2-vinyloxyisopropoxy)isopropoxy}ethyl (meth)acrylate, 2-{2-(2-vinyloxyethoxy)ethoxy}propyl (meth)acrylate, 2-{2-(2-vinyloxyethoxy)isopropoxy}propyl (meth)acrylate, 2-{2-(2-vinyloxyisopropoxy)ethoxy}propyl (meth)acrylate, 2-{2-(2-vinyloxyisopropoxy)isopropoxy}propyl (meth)acrylate, 2-{2-(2-vinyloxyethoxy)ethoxy}isopropyl (meth)acrylate, 2-{2-(2-vinyloxyethoxy)isopropoxy}isopropyl (meth)acrylate, 2-{2-(2-vinyloxyisopropoxy)ethoxy}isopropyl (meth)acrylate, 2-{2-(2-vinyloxyisopropoxy)isopropoxy}isopropyl (meth)acrylate, 2-[2-{2-(2-vinyloxyethoxy)ethoxy}ethoxy]ethyl (meth)acrylate, 2-[2-{2-(2-vinyloxyisopropoxy)ethoxy}ethoxy]ethyl (meth)acrylate, and 2-(2-[2-{2-(2-vinyloxyethoxy)ethoxy}ethoxy]ethoxy)ethyl (meth)acrylate. The (meth)acrylate means an acrylate or methacrylate.

Component D preferably includes a polyfunctional polymer containing 50 or more acryloyl groups per molecule. The crosslinking density of the polymer layer 3 tends to increase as the number of functional groups of the material increases, and useful examples of the material include a polymer containing a reactive group (e.g., acryloyl group). Thus, a polyfunctional polymer containing 50 or more acryloyl groups per molecule increases the rubbing resistance effectively. Component D more preferably includes a polyfunctional polymer containing 60 or more acryloyl groups per molecule, still more preferably a polyfunctional polymer containing 70 or more acryloyl groups per molecule. From the viewpoint of rubbing resistance, the upper limit of the number of acryloyl groups per molecule of the polyfunctional polymer is preferably 100.

Examples of the polyfunctional polymer containing 50 or more acryloyl groups per molecule in Component D include a cationic polymer of 2-(2-vinyloxyethoxy)ethyl (meth)acrylate. In particular, a cationic polymer of 2-(2-vinyloxyethoxy)ethyl acrylate is preferred. The 2-(2-vinyloxyethoxy)ethyl acrylate is a hybrid monomer in which a vinyl ether group and an acryloyl group coexist in a molecule. Selectively cationically polymerizing the vinyl ether group alone in the hybrid monomer produces a polyfunctional polymer containing about 54 acryloyl groups per molecule (weight average molecular weight: 25000, acrylic equivalent: 186, glass transition temperature: 76° C.). Known examples of the 2-(2-vinyloxyethoxy)ethyl acrylate include "VEER" from Nippon Shokubai Co., Ltd.

The polymerizable composition may further contain a polymerization initiator. Thereby, the curability of the polymerizable composition increases.

Examples of the polymerization initiator include photopolymerization initiators and thermal polymerization initiators, with the photopolymerization initiators preferred. A photopolymerization initiator is active to active energy rays, and is added to initiate the polymerization reaction that polymerizes monomers.

Examples of the photopolymerization initiator include radical polymerization initiators, anionic polymerization initiators, and cationic polymerization initiators. Examples of such a photopolymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acylphosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. Known examples of 2,4,6-trimethylbenzoyl-diphenyl-phosphine oxide include "LUCIRIN® TPO" and "IRGACURE® TPO" from IGM Resins. Known examples of bis(2,4,6-trimethylbenzoyl)-phenylphosphine oxide include "IRGACURE 819" from IGM Resins. Known examples of 1-hydroxy-cyclohexyl-phenyl-ketone include "IRGACURE 184" from IGM Resins.

The polymerizable composition may further contain a solvent (component other than active components). In this case, the solvent may be contained in Components A to D together with active components, or may be contained separately from Components A to D.

Examples of the solvent include alcohols (C1-C10 ones such as methanol, ethanol, n- or i-propanol, n-, sec-, or, t-butanol, benzyl alcohol, octanol), ketones (C3-C8 ones such as acetone, methyl ethyl ketone, methyl isobutyl ketone, diisobutyl ketone, dibutyl ketone, cyclohexane), esters or ether esters (C4-C10 ones such as ethyl acetate, butyl acetate, ethyl lactate), γ-butyrolactone, ethylene glycol monomethyl acetate, propylene glycol monomethyl acetate, ethers (C4-C10 ones such as EG monomethyl ether (methyl cellosolve), EG monomethyl ether (ethyl cellosolve), diethylene glycol monobutyl ether (butyl cellosolve), propylene glycol monomethyl ether), aromatic hydrocarbons (C6-C10 ones such as benzene, toluene, xylene), amides (C3-C10 ones such as dimethylformamide, dimethylacetamide, N-methylpyrrolidone), halogenated hydrocarbons (C1-C2 ones such as methylene dichloride, ethylene dichloride), and petroleum-based solvents (e.g., petroleum ether, petroleum naphtha).

In terms of the antifouling properties, the polymer layer 3 preferably has a surface (the surface remote from the substrate 2) that shows a contact angle of 130° or greater with water and a contact angle of 30° or greater with hexadecane.

The antifouling film 1 may be used in any way that utilizes the excellent antifouling properties of the antifouling film 1, and may be used as, for example, an optical film such as an antireflective film. Such an antireflective film contributes to an increase in visibility when it is mounted inside or outside a display device.

The antifouling properties of the antifouling film 1 may mean that dirt adhering to the surface (the surface remote from the substrate 2) of the polymer layer 3 is easily removable, or that dirt is not likely to adhere to the surface (the surface remote from the substrate 2) of the polymer layer 3. The antifouling film 1, owing to its moth-eye structure, can achieve better antifouling properties than a conventional fluorine-containing film having a normal surface such as a flat surface.

Figure 3:
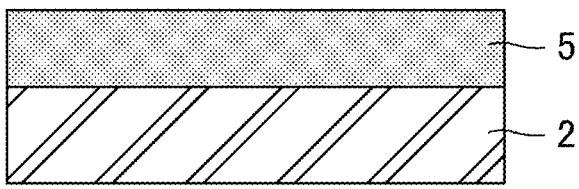
FIG. 3 is a schematic cross-sectional view illustrating an exemplary method for producing the antifouling film of the embodiment.
Figure 3:
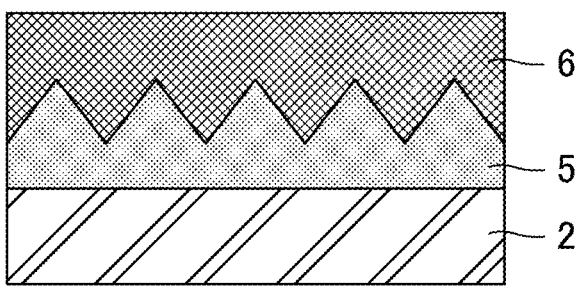
Figure 3:
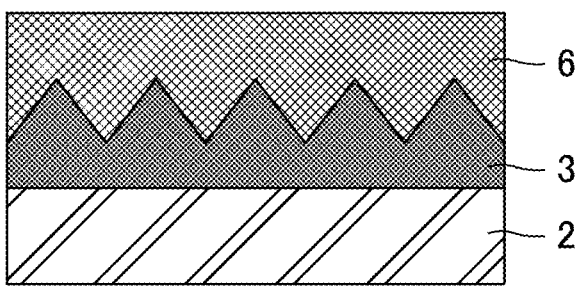
Figure 3:
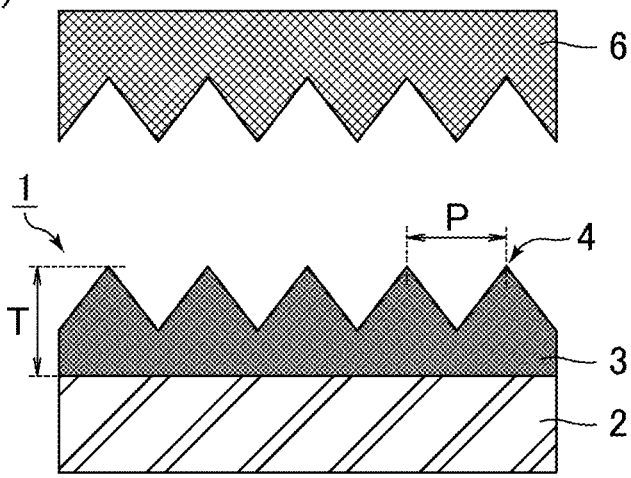

The antifouling film 1 can be produced by, for example, the following production method. FIG. 3 is a schematic cross-sectional view illustrating an exemplary method for producing the antifouling film of the embodiment.

Process 1

As shown in FIG. 3(a), a polymerizable composition 5 is applied to a surface of the substrate 2.

Examples of techniques of applying the polymerizable composition 5 include spray coating, gravure coating, slot-die coating, and bar coating. For application of the polymerizable composition 5, gravure coating or slot-die coating is preferred in order to level the thickness of the resulting film and to achieve good productivity.

The polymerizable composition 5 contains the above proportions of Components A to D. When the polymerizable composition 5 further contains a solvent (component other than active components), heating (drying) may be performed to remove the solvent after application of the polymerizable composition 5. The heating is preferably performed at a temperature equal to or higher than the boiling point of the solvent.

Process 2

As shown in FIG. 3(b), the substrate 2 is pushed to a die 6 with the polymerizable composition 5 in between. As a result, an uneven structure is formed on a surface (surface remote from the substrate 2) of the polymerizable composition 5.

Process 3

The polymerizable composition 5 having an uneven structure on the surface is cured. As a result, as shown in FIG. 3(c), the polymer layer 3 is formed.

Curing of the polymerizable composition 5 is achieved by, for example, application of active energy rays or heating, preferably by application of active energy rays, more preferably by application of ultraviolet rays. Application of active energy rays may be performed from the substrate 2 side of the polymerizable composition 5, or may be performed from the die 6 side of the polymerizable composition 5. Application of active energy rays may be performed once or may be performed multiple times. Curing of the polymerizable composition 5 (Process 3) may be performed simultaneously with the aforementioned formation of the uneven structure on the polymerizable composition 5 (Process 2).

Process 4

As shown in FIG. 3(d), the die 6 is released from the polymer layer 3. As a result, the antifouling film 1 is completed.

In the aforementioned exemplary production method, Processes 1 to 4 can be continuously and efficiently performed if the substrate 2 is in the form of a roll, for example.

In Processes 1 and 2, the present exemplary production method includes a process of applying the polymerizable composition 5 to the surface of the substrate 2 and then pushing the substrate 2 to the die 6 with the polymerizable composition 5 in between. Yet, the method may include a process of applying the polymerizable composition 5 to a surface of the die 6, and then pushing the substrate 2 to the die 6 with the polymerizable composition 5 in between.

The die 6 may be one produced by the following method. First, a film of aluminum that is a material of the die 6 is formed on a surface of a support by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Examples of a material of the support include glass; metals such as stainless steel and nickel; polyolefinic resins such as polypropylene, polymethylpentene, and cyclic olefinic polymers (typified by norbornene-based resin, e.g., "Zeonor®" from Zeon Corp., "Arton®" from JSR Corp.); polycarbonate resin; and resins such as polyethylene terephthalate, polyethylene naphthalate, and triacetyl cellulose. Instead of the support with an aluminum film formed on the surface, an aluminum support may be used.

The die 6 may have a shape of a flat plate or a roll, for example.

The surface of the die 6 preferably has undergone release treatment. Thereby, the die 6 can be easily removed from the polymer layer 3. Further, this treatment makes the surface free energy of the die 6 low, and thus the fluorine atoms in Component C can uniformly be distributed on the surface (the surface remote from the substrate 2) of the polymerizable composition 5 when the substrate 2 is pushed to the die 6 in Process 2. Further, this treatment can prevent early removal of the fluorine atoms in Component C from the surface (the surface remote from the substrate 2) of the polymerizable composition 5 before curing of the polymerizable composition 5. As a result, in the antifouling film 1, the fluorine atoms in Component C can uniformly be distributed on the surface (the surface remote from the substrate 2) of the polymer layer 3.

Examples of a material to be used for release treatment of the die 6 include fluorine-based materials, silicone-based materials, and phosphate-ester-based materials. Known examples of the fluorine-based materials include "Optool DSX" and "Optool AES4" from Daikin Industries, Ltd.

EXAMPLES AND COMPARATIVE EXAMPLES

The present invention is described in more detail based on the following examples and comparative examples. The examples, however, are not intended to limit the scope of the present invention.

The materials used in production of the antifouling films in the examples and comparative examples were as follows.

Substrate

"TAC-TD80U" from Fujifilm Corp. was used. The thickness thereof was 80 µm.

Die

A die produced by the following method was used. First, a film of aluminum that is a material of the die was formed on a 10-cm-square glass substrate by sputtering. The thickness of the resulting aluminum layer was 1.0 µm. Next, the resulting aluminum layer was repetitively subjected to anodizing and etching. Thereby, an anodized layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation. The surface of the die was subjected to release treatment with "Optool AES4" from Daikin Industries, Ltd. in advance.

Polymerizable Composition

Polymerizable compositions R1 to R12 and r1 to r8 formed from the materials shown in Tables 1 to 5 were used. The values in Tables 1 to 5 are each the component content (unit: parts by weight) in the composition. The abbreviations of the respective components are as follows.

Polyfunctional Acrylate

"U"
  "U-10HA" from Shin Nakamura Chemical Co., Ltd.
  The number of functional groups: 10
  Ethylene oxide group: not contained
  Active component: 100 wt %
"A-DPH"
  "NK Ester A-DPH" from Shin Nakamura Chemical Co., Ltd.
  The number of functional groups: 6
  Ethylene oxide group: not contained
  Active component: 100 wt %
"A-TMPT"
  "NK Ester A-TMPT" from Shin Nakamura Chemical Co., Ltd.
  The number of functional groups: 3
  Ethylene oxide group: not contained
  Active component: 100 wt %
"DPCA-60"
  "KAYARAD DPCA-60" from Nippon Kayaku Co., Ltd.
  The number of functional groups: 6
  Ethylene oxide group: not contained
  Active component: 100 wt %
"A-400"
  "NK Ester A-400" from Shin Nakamura Chemical Co., Ltd.
  The number of functional groups: 2
  The number of ethylene oxide groups: 4.5 per functional group
  Active component: 100 wt %
"APG-400"
  "NK Ester APG-400" from Shin Nakamura Chemical Co., Ltd.
  The number of functional groups: 2
  Ethylene oxide group: not contained
  Active component: 100 wt %
"ATM-4PL"
  "NK Ester ATM-4PL" from Shin Nakamura Chemical Co., Ltd.
  The number of functional groups: 4
  Ethylene oxide group: not contained
  Active component: 100 wt %
"A-TMPT-3PO"
  "NK Ester A-TMPT-3PO" from Shin Nakamura Chemical Co., Ltd.
  The number of functional groups: 3
  Ethylene oxide group: not contained
  Active component: 100 wt %

Monofunctional Amide Monomer

"DM"
  "DMAA" from KJ Chemicals Corp.
  Active component: 100 wt %
"AC"
  "ACMO" from KJ Chemicals Corp.
  Active component: 100 wt %

Fluorine-Based Release Agent

"MT70"
  "Fomblin MT70" from Solvay
  Perfluoropolyether group: contained
  Active component: 80 wt % (perfluoropolyether derivative)
  Solvent: 20 wt % (methyl ethyl ketone)
"RS-76-NS"
  "Megaface RS-76-NS" from DIC Corp.
  Perfluoropolyether group: not contained (perfluoroalkyl group was contained)
  Active component: 100 wt % (fluorine-containing oligomer (20 wt %) and dipropylene glycol diacrylate (80 wt %))

Vinyl-Based Polymer

"AX"
  One obtained by the following method was used. First, a four-neck flask equipped with a stirrer, a thermometer, a dropping funnel, and a nitrogen inlet tube was charged with 100 g of toluene, followed by stirring at 20° C. After the stirring, 200 g of "VEER" from Nippon Shokubai Co., Ltd. and a mixed melt of 30 g of ethyl acetate and 10.2 mg of phosphotungstic acid were dropped, each over two hours. The dropping was followed by stirring for five hours for polymerization. After the polymerization, toluene and ethyl acetate were removed by an evaporator, whereby "AX" (vinyl-based polymer) was obtained.

The specifications of "AX" were as follows.
  The number of acryloyl groups per molecule: about 54
  Weight average molecular weight: 25000
  Acrylic equivalent: 186
  Glass transition temperature: 76° C.

The glass transition temperature was determined from the temperature corresponding to the peak value in a graph showing the temperature dependence of tan $\delta = E''/E'$ (E': storage modulus, E'': loss modulus). The storage modulus E' and the loss modulus E'' were measured with a dynamic mechanical analyzer "DMA7100" from Hitachi High-Tech Science Corporation with a measurement temperature range of 50° C. to 250° C., a rate of temperature increase of 5° C./min, and a frequency of 10 Hz. The measurement sample used was a cured product obtained by curing "AX" by ultraviolet irradiation (dose: 1 $J/cm^2$) and having a rectangular cross-sectional shape (length: 35 mm, width: 5 mm, thickness: 1 mm). The storage modulus E' and the loss modulus E'' were measured with the ends of the measurement sample clamped. The length of the portion not clamped was 20 mm.

Polymerization Initiator

"TPO"
  "LUCIRIN TPO" from IGM Resins
  Active component: 100 wt %

TABLE 1

| Component | Category | Abbreviation | Polymerizable composition | | | |
|---|---|---|---|---|---|---|
| | | | R1 | R2 | R3 | R4 |
| Polyfunctional acrylate | Component A | U | — | — | — | — |
| | | A-DPH | — | — | — | — |
| | | A-TMPT | — | 3.8 | — | — |
| | | DPCA-60 | 24 | 23.6 | — | — |
| | | A-400 | 43 | 43.8 | 29 | 24 |
| | | APG-400 | — | — | 24 | 24 |
| | | ATM-4PL | — | — | — | — |
| | | A-TMPT-3PO | — | — | — | — |
| Monofunctional amide monomer | Component B | DM | 19.2 | 19.2 | 19.2 | 19.2 |
| | | AC | — | — | — | — |
| Fluorine-based release agent | Component C | MT70 | 2.375 | 2.375 | 2.375 | 2.375 |
| | | RS-76-NS | — | — | — | — |
| Vinyl-based polymer | Component D | AX | 10 | 5.8 | 24 | 29 |
| Polymerization initiator | — | TPO | 1.9 | 1.9 | 1.9 | 1.9 |

TABLE 2

| Component | Category | Abbreviation | Polymerizable composition | | | |
|---|---|---|---|---|---|---|
| | | | R5 | R6 | R7 | R8 |
| Polyfunctional acrylate | Component A | U | — | — | — | — |
| | | A-DPH | — | — | — | — |
| | | A-TMPT | 20 | — | — | — |
| | | DPCA-60 | — | — | — | — |
| | | A-400 | 41 | 43.4 | 43.4 | 33.3 |
| | | APG-400 | — | — | — | — |
| | | ATM-4PL | — | 28.4 | 32.2 | — |
| | | A-TMPT-3PO | — | — | — | 5.3 |
| Monofunctional amide monomer | Component B | DM | 10.6 | 14.4 | 10.6 | 28.8 |
| | | AC | — | — | — | — |
| Fluorine-based release agent | Component C | MT70 | — | 2.375 | 2.375 | 2.375 |
| | | RS-76-NS | 4.8 | — | — | — |
| Vinyl-based polymer | Component D | AX | 23 | 10 | 10 | 28.8 |
| Polymerization initiator | — | TPO | 0.6 | 1.9 | 1.9 | 1.9 |

TABLE 3

| Component | Category | Abbreviation | Polymerizable composition | | | |
|---|---|---|---|---|---|---|
| | | | R9 | R10 | R11 | R12 |
| Polyfunctional acrylate | Component A | U | — | — | — | — |
| | | A-DPH | — | — | — | — |
| | | A-TMPT | — | — | — | — |
| | | DPCA-60 | — | — | — | — |
| | | A-400 | 43.8 | 45.2 | 36.1 | 43.8 |
| | | APG-400 | — | — | — | — |
| | | ATM-4PL | — | — | — | — |
| | | A-TMPT-3PO | 23.2 | 23.2 | 23.2 | 23.2 |
| Monofunctional amide monomer | Component B | DM | 19.2 | 19.2 | 19.2 | — |
| | | AC | — | — | — | 19.2 |
| Fluorine-based release agent | Component C | MT70 | 2.375 | 0.625 | 12 | 2.375 |
| | | RS-76-NS | — | — | — | — |
| Vinyl-based polymer | Component D | AX | 10 | 10 | 10 | 10 |
| Polymerization initiator | — | TPO | 1.9 | 1.9 | 1.9 | 1.9 |

TABLE 4

| Component | Category | Abbreviation | Polymerizable composition | | | |
|---|---|---|---|---|---|---|
| | | | r1 | r2 | r3 | r4 |
| Polyfunctional acrylate | Component A | U | — | — | 23 | — |
| | | A-DPH | — | 23 | — | — |
| | | A-TMPT | 9.6 | 20 | 20 | — |
| | | DPCA-60 | 23.6 | — | — | — |
| | | A-400 | 43.8 | 41 | 41 | 19.3 |
| | | APG-400 | — | — | — | 24 |
| | | ATM-4PL | — | — | — | — |
| | | A-TMPT-3PO | — | — | — | — |
| Monofunctional amide monomer | Component B | DM | 19.2 | 10.6 | 10.6 | 19.2 |
| | | AC | — | — | — | — |
| Fluorine-based release agent | Component C | MT70 | 2.375 | — | — | 2.375 |
| | | RS-76-NS | — | 4.8 | 4.8 | — |
| Vinyl-based polymer | Component D | AX | — | — | — | 33.7 |
| Polymerization initiator | — | TPO | 1.9 | 0.6 | 0.6 | 1.9 |

TABLE 5

| Component | Category | Abbreviation | Polymerizable composition | | | |
|---|---|---|---|---|---|---|
| | | | r5 | r6 | r7 | r8 |
| Polyfunctional acrylate | Component A | U | — | — | — | — |
| | | A-DPH | — | — | — | — |
| | | A-TMPT | — | — | — | — |
| | | DPCA-60 | — | — | — | — |
| | | A-400 | — | 30.3 | 45.7 | 31.3 |
| | | APG-400 | 45.3 | — | — | — |
| | | ATM-4PL | — | — | — | — |
| | | A-TMPT-3PO | 33.2 | 3.4 | 23.2 | 23.2 |
| Monofunctional amide monomer | Component B | DM | 7.7 | 33.7 | 19.2 | 19.2 |
| | | AC | — | — | — | — |
| Fluorine-based release agent | Component C | MT70 | 2.375 | 2.375 | — | 18 |
| | | RS-76-NS | — | — | — | — |
| Vinyl-based polymer | Component D | AX | 10 | 28.8 | 10 | 10 |
| Polymerization initiator | — | TPO | 1.9 | 1.9 | 1.9 | 1.9 |

Tables 6 to 10 show the following amounts (1) and (2) in terms of active components.

(1) Component A to D contents in the polymerizable composition (in the tables, "Component A content", "Component B content", "Component C content", and "Component D content")

(2) Amide group content of Component B in the polymerizable composition (in the tables, "amide group content")

TABLE 6

| | Polymerizable composition | | | |
|---|---|---|---|---|
| | R1 | R2 | R3 | R4 |
| Component A content (wt %) | 67.0 | 71.2 | 53.0 | 48.0 |
| Component B content (wt %) | 19.2 | 19.2 | 19.2 | 19.2 |
| Component C content (wt %) | 1.9 | 1.9 | 1.9 | 1.9 |
| Component D content (wt %) | 10.0 | 5.8 | 24.0 | 29.0 |
| Amide group content (mmol/g) | 1.94 | 1.94 | 1.94 | 1.94 |

TABLE 7

| | Polymerizable composition | | | |
|---|---|---|---|---|
| | R5 | R6 | R7 | R8 |
| Component A content (wt %) | 61.0 | 71.8 | 75.6 | 38.6 |
| Component B content (wt %) | 10.6 | 14.4 | 10.6 | 28.8 |
| Component C content (wt %) | 4.8 | 1.9 | 1.9 | 1.9 |
| Component D content (wt %) | 23.0 | 10.0 | 10.0 | 28.8 |
| Amide group content (mmol/g) | 1.07 | 1.45 | 1.07 | 2.91 |

TABLE 8

| | Polymerizable composition | | | |
|---|---|---|---|---|
| | R9 | R10 | R11 | R12 |
| Component A content (wt %) | 67.0 | 68.4 | 59.3 | 67.0 |
| Component B content (wt %) | 19.2 | 19.2 | 19.2 | 19.2 |
| Component C content (wt %) | 1.9 | 0.5 | 9.6 | 1.9 |
| Component D content (wt %) | 10.0 | 10.0 | 10.0 | 10.0 |
| Amide group content (mmol/g) | 1.94 | 1.94 | 1.94 | 1.36 |

TABLE 9

|  | Polymerizable composition | | | |
|---|---|---|---|---|
|  | r1 | r2 | r3 | r4 |
| Component A content (wt %) | 77.0 | 84.0 | 84.0 | 43.3 |
| Component B content (wt %) | 19.2 | 10.6 | 10.6 | 19.2 |
| Component C content (wt %) | 1.9 | 4.8 | 4.8 | 1.9 |
| Component D content (wt %) | 0.0 | 0.0 | 0.0 | 33.7 |
| Amide group content (mmol/g) | 1.94 | 1.07 | 1.07 | 1.94 |

TABLE 10

|  | Polymerizable composition | | | |
|---|---|---|---|---|
|  | r5 | r6 | r7 | r8 |
| Component A content (wt %) | 78.5 | 33.7 | 68.9 | 54.5 |
| Component B content (wt %) | 7.7 | 33.7 | 19.2 | 19.2 |
| Component C content (wt %) | 1.9 | 1.9 | 0.0 | 14.4 |
| Component D content (wt %) | 10.0 | 28.8 | 10.0 | 10.0 |
| Amide group content (mmol/g) | 0.78 | 3.40 | 1.94 | 1.94 |

Example 1

An antifouling film of Example 1 was produced by the method described in the above production example.

Process 1

The polymerizable composition R1 was applied to a surface of the substrate 2 in a belt-like pattern. The polymerizable composition R1 was spread to the entire surface of the substrate 2 with a bar coater. The workpiece in which the polymerizable composition R1 was applied to the surface of the substrate 2 was heated in an oven at 80° C. for one minute, so that the solvent was evaporated from the polymerizable composition R1.

Process 2

The substrate 2 was pushed to the die 6 with the polymerizable composition R1 (from which the solvent was evaporated) in between using a hand roller. As a result, an uneven structure was formed on a surface (surface remote from the substrate 2) of the polymerizable composition R1.

Process 3

The polymerizable composition R1 having the uneven structure on the surface thereof was irradiated with ultraviolet rays (dose: 1 J/cm$^2$) from the substrate 2 side, so that the polymerizable composition R1 was cured. As a result, the polymer layer 3 was formed.

Process 4

The die 6 was released from the polymer layer 3. As a result, the antifouling film 1 was completed. The thickness T of the polymer layer 3 was 10.5 μm.
The surface specifications of the antifouling film 1 were as follows.
Shape of projections 4: temple-bell-like shape
Average pitch of projections 4: 200 nm
Average height of projections 4: 200 nm
Average aspect ratio of projections 4: 1.0

The surface specifications of the antifouling film 1 were evaluated using a scanning electron microscope "S-4700" from Hitachi High-Technologies Corp. For the evaluation, osmium(VIII) oxide from Wako Pure Chemical Industries, Ltd. was applied (to a thickness of 5 nm) on the surface (the surface remote from the substrate 2) of the polymer layer 3 using an osmium coater "Neoc-ST" from Meiwafosis Co., Ltd.

Examples 2 to 12 and Comparative Examples 1 to 8

An antifouling film of each example was produced in the same manner as in Example 1, except that the composition was changed as shown in Tables 11 to 15.

Evaluations

The antifouling films of the examples were subjected to the following evaluations. Tables 11 to 15 show the results.

Transparency of Polymerizable Composition

The polymerizable composition (in the state before heating process) of each example was placed in a clear test tube, and the condition of the composition was visually observed in an environment with an illuminance of 100 1× (fluorescent lamp). The evaluation criteria were as follows.
Good: the composition was transparent or slightly cloudy.
Fair: the composition was slightly cloudy, but no precipitate was observed even after it was left to stand for one day.
Poor: the composition was cloudy, and precipitates were observed after it was left to stand for one day.
A higher transparency of the polymerizable composition was determined to show a higher compatibility between Components A to D in the polymerizable composition.

Antifouling Properties

For the antifouling properties, the water repellency, the oil repellency, and the ease of wiping off fingerprints were evaluated.

Water Repellency

Water was dropped on the surface (the surface remote from the substrate) of the polymer layer of the antifouling film of each example, and the contact angle was measured immediately after the dropping.

Oil Repellency

Hexadecane was dropped on the surface (the surface remote from the substrate) of the polymer layer of the antifouling film of each example, and the contact angle was measured immediately after the dropping.
The contact angles were each the average value of contact angles measured at the following three points by the θ/2 method (θ/2=arctan(h/r), wherein θ: contact angle, r: radius of droplet, h: height of droplet) using a portable contact angle meter "PCA-1" from Kyowa Interface Science Co., Ltd. The first measurement point selected was the central portion of the antifouling film of each example. The second and third measurement points were two points that were 20 mm or more apart from the first measurement point and were point-symmetrical to each other about the first measurement point.

Ease of Wiping Off Fingerprints

First, for the antifouling film of each example, a black acrylic sheet was attached to the surface remote from the polymer layer of the substrate with an optical adhesive layer in between. Next, artificially contaminated liquid from Isekyu Co., Ltd. was brought into contact with a rubber-gloved finger using "Bemcot® S-2" from Asahi Kasei Fibers Corp. impregnated with 0.1 ml of the artificially contaminated liquid. The artificially contaminated liquid was attached as a supposed fingerprint to the surface (the surface remote from the substrate) of the polymer layer of the antifouling film of each example with the finger. After 10 minutes, the surface was rubbed 10 times in a reciprocating motion using "Bemcot S-2" from Asahi Kasei Fibers Corp. Whether the artificially contaminated liquid was wiped off or not was visually observed in an environment with an illuminance of 100 1x (fluorescent lamp). The evaluation criteria were as follows.

Good: The artificially contaminated liquid was completely wiped off and no wiping residue was observed.

Fair: The artificially contaminated liquid was not obvious, but slight wiping residue was observed when the light from the fluorescent lamp was reflected on the surface.

Poor: The artificially contaminated liquid was not wiped off at all.

The cases evaluated as good or fair were considered as within the allowable level (having excellent ease of wiping off fingerprints).

Rubbing Resistance

For the rubbing resistance, a change in reflectance before and after rubbing a surface of the antifouling film with a non-woven cloth was evaluated. This evaluation is made assuming the following phenomenon. For example, with a low rubbing resistance, rubbing the surface (the surface remote from the substrate) of the polymer layer of the antifouling film with a non-woven cloth may cause troubles such as that the projections stick to each other and do not return to the original state, that the projections are fallen and do not rise again, and that the projections are broken. This may lead to different reflectances of a portion with a trouble and a portion with no trouble, causing the portion with a trouble of the antifouling film (polymer layer) to appear white. In other words, an antifouling film with a low rubbing resistance shows a large change in reflectance before and after rubbing of the surface.

Change in Reflectance

First, for the antifouling film of each example, a black acrylic sheet was attached to the surface remote from the polymer layer of the substrate. The surface (the surface remote from the substrate) of the polymer layer of the antifouling film of each example was irradiated with light from a light source at a polar angle of 5°, so that the specular spectral reflectance at an angle of incidence of 5° was measured using "UV-3100PC" from Shimadzu Corporation at a wavelength of 380 to 780 nm. The average reflectance at a wavelength of 450 to 650 nm was calculated from the result, and the obtained average reflectance was taken as the reflectance A (unit: %).

The surface (the surface remote from the substrate) of the polymer layer of the antifouling film of each example was rubbed 10 times in a reciprocating motion using "Bemcot® Labo" from Asahi Kasei Fibers Corp. Then, the specular spectral reflectance at an angle of incidence of 5° of the antifouling film of each example was measured by the same procedure as described above. The average reflectance at a wavelength of 450 to 650 nm was calculated from the result, and the obtained average reflectance was taken as the reflectance B (unit: %).

The change "R" (unit: %) in reflectance was calculated from the reflectances A and B obtained by the above procedure based on the following formula (X).

$$R = 100 \times (\text{reflectance } B - \text{reflectance } A)/\text{reflectance } A \quad (X)$$

The evaluation criteria were as follows.
A: R≤15
B: 15<R<25
C: 25≤R≤30
D: 30<R<50
E: R≥50

The cases evaluated as A, B, or C were considered as within the allowable level (having excellent rubbing resistance) without the antifouling film (polymer layer) appearing white.

Adhesion

The adhesion was evaluated by the following method. First, 11 vertical cuts and 11 horizontal cuts were made in a grid pattern with 1 mm spacing on the surface (the surface remote from the substrate) of the polymer layer using a snap-off utility knife at a temperature of 23° C. and a humidity of 50%. Thereby, 100 squares (1 mm square) were formed. Then, polyester adhesive tape "No. 31B" from Nitto Denko Corp. was press-applied to the squares and peeled off in the 90° direction relative to the surface of the squares at a rate of 100 mm/s. The state of the polymer layer on the substrate after the peeling was visually observed. The results are shown as "X" (X means the number of squares in which the polymer layer was not peeled off but left on the substrate). The evaluation criteria were as follows.
A: X=100
B: X=95 to 99
C: X=0 to 94

The cases evaluated as A or B were considered as within the allowable level (having excellent adhesion).

Reliability

For the reliability, the bleed-out state was evaluated.

Bleed-Out State

The antifouling film of each example was subjected to a high temperature/high humidity test where the film was left at a temperature of 60° C. and a humidity of 95% for 1000 hours. The cloudiness level of the polymer layer of the antifouling film of each example was visually observed in an environment with an illuminance of 100 1x (fluorescent lamp). The antifouling films whose polymer layer did not turn cloudy as a result of the visual observation were determined as not causing bleed-out, and were therefore evaluated as having good reliability. The antifouling films whose polymer layer turned cloudy were determined as causing bleed-out, and were therefore evaluated as having poor reliability. When determination by visual observation is difficult, the specular reflection spectra at an angle of incidence of 5° measured before and after the high temperature/high humidity test were superposed on each other, and the reliability was evaluated based on whether or not the spectra were aligned. Specifically, the antifouling films with the same reflectance in the spectra before and after the high temperature/high humidity test were determined as having good reliability, and the antifouling films with different reflectances in the spectra before and after the high temperature/high humidity test (when the overall reflectance increased after the high temperature/high humidity test) were determined as having poor reliability. The specular spectrum at an angle of incidence of 5° was measured as follows. A black acrylic sheet was attached to the surface remote from the polymer layer of the substrate of the antifouling film of each example. The surface (the surface remote from the substrate) of the polymer layer of the antifouling film of each example was irradiated with light from a light source at a polar angle of 5°, so that the specular reflection spectrum at a wavelength of 380 to 780 nm was measured using "UV-3100PC" from Shimadzu Corporation.

TABLE 11

|  |  |  | Example 1 | Example 2 | Example 3 | Example 4 |
|---|---|---|---|---|---|---|
|  | Polymerizable composition |  | R1 | R2 | R3 | R4 |
|  | Transparency of polymerizable composition |  | Good | Good | Good | Fair |
| Antifouling properties | Water repellency | Contact angle with water (°) | 155 | 152 | 153 | 151 |
|  | Oil repellency | Contact angle with hexadecane (°) | 87 | 85 | 80 | 76 |
|  | Ease of wiping off fingerprints |  | Good | Good | Good | Good |
| Rubbing resistance | Change in reflectance | Results (%) | 16 | 26 | 4 | 10 |
|  |  | Evaluation | B | C | A | A |
| Adhesion |  | Results (number) | 100 | 100 | 100 | 100 |
|  |  | Evaluation | A | A | A | A |
| Reliability |  | Bleed-out state | Good | Good | Good | Good |

TABLE 12

|  |  |  | Example 5 | Example 6 | Example 7 | Example 8 |
|---|---|---|---|---|---|---|
|  | Polymerizable composition |  | R5 | R6 | R7 | R8 |
|  | Transparency of polymerizable composition |  | Good | Good | Good | Fair |
| Antifouling properties | Water repellency | Contact angle with water (°) | 138 | 159 | 158 | 155 |
|  | Oil repellency | Contact angle with hexadecane (°) | 42 | 88 | 87 | 89 |
|  | Ease of wiping off fingerprints |  | Fair | Good | Good | Good |
| Rubbing resistance | Change in reflectance | Results (%) | 23 | 18 | 16 | 27 |
|  |  | Evaluation | B | B | B | C |
| Adhesion |  | Results (number) | 98 | 100 | 96 | 100 |
|  |  | Evaluation | B | A | B | A |
| Reliability |  | Bleed-out state | Good | Good | Good | Good |

TABLE 13

|  |  |  | Example 9 | Example 10 | Example 11 | Example 12 |
|---|---|---|---|---|---|---|
|  | Polymerizable composition |  | R9 | R10 | R11 | R12 |
|  | Transparency of polymerizable composition |  | Good | Good | Good | Good |
| Antifouling properties | Water repellency | Contact angle with water (°) | 159 | 148 | 160 | 152 |
|  | Oil repellency | Contact angle with hexadecane (°) | 90 | 58 | 92 | 85 |
|  | Ease of wiping off fingerprints |  | Good | Fair | Good | Good |
| Rubbing resistance | Change in reflectance | Results (%) | 17 | 27 | 20 | 24 |
|  |  | Evaluation | B | C | B | B |
| Adhesion |  | Results (number) | 100 | 100 | 100 | 100 |
|  |  | Evaluation | A | A | A | A |
| Reliability |  | Bleed-out state | Good | Good | Good | Good |

TABLE 14

|  |  |  | Comparative Example 1 | Comparative Example 2 | Comparative Example 3 | Comparative Example 4 |
|---|---|---|---|---|---|---|
|  | Polymerizable composition |  | r1 | r2 | r3 | r4 |
|  | Transparency of polymerizable composition |  | Good | Good | Good | Poor |
| Antifouling properties | Water repellency | Contact angle with water (°) | 158 | 135 | 132 | 155 |
|  | Oil repellency | Contact angle with hexadecane (°) | 87 | 37 | 34 | 84 |
|  | Ease of wiping off fingerprints |  | Good | Fair | Fair | Good |

TABLE 14-continued

|  |  |  | Comparative Example 1 | Comparative Example 2 | Comparative Example 3 | Comparative Example 4 |
| --- | --- | --- | --- | --- | --- | --- |
| Rubbing resistance | Change in reflectance | Results (%) | 75 | 68 | 35 | 46 |
|  |  | Evaluation | E | E | D | D |
| Adhesion |  | Results (number) | 100 | 100 | 100 | 100 |
|  |  | Evaluation | A | A | A | A |
| Reliability |  | Bleed-out state | Good | Good | Good | Poor |

TABLE 15

|  |  |  | Comparative Example 5 | Comparative Example 6 | Comparative Example 7 | Comparative Example 8 |
| --- | --- | --- | --- | --- | --- | --- |
|  | Polymerizable composition |  | r5 | r6 | r7 | r8 |
|  | Transparency of polymerizable composition |  | Fair | Fair | Good | Poor |
| Antifouling properties | Water repellency | Contact angle with water (°) | 154 | 159 | 24 | 162 |
|  | Oil repellency | Contact angle with hexadecane (°) | 83 | 90 | 12 | 94 |
|  | Ease of wiping off fingerprints |  | Good | Good | Poor | Good |
| Rubbing resistance | Change in reflectance | Results (%) | 21 | 43 | 56 | 34 |
|  |  | Evaluation | B | D | E | D |
| Adhesion |  | Results (number) | 45 | 100 | 100 | 100 |
|  |  | Evaluation | C | A | A | A |
| Reliability |  | Bleed-out state | Good | Good | Good | Poor |

As shown in Tables 1 to 13, Examples 1 to 12 each achieved an antifouling film that was excellent in the antifouling properties, rubbing resistance, and adhesion. Also, in Examples 1 to 12, the transparency of the polymerizable composition was high and the reliability was excellent.

In contrast, as shown in Tables 14 and 15, Comparative Examples 1 to 8 each failed to achieve an antifouling film that was excellent in the antifouling properties, rubbing resistance, and adhesion.

In Comparative Example 1, the rubbing resistance was low since the polymerizable composition r1 did not contain Component D.

In Comparative Example 2, the rubbing resistance was low since the polymerizable composition r2 did not contain Component D.

In Comparative Example 3, the rubbing resistance was low since the polymerizable composition r3 did not contain Component D.

In Comparative Example 4, the rubbing resistance was low and the reliability was poor since in the polymerizable composition r4, the Component D content in terms of active components was higher than 30 wt %. Also, the transparency of the polymerizable composition r4 was low since Component C was insolubilized.

In Comparative Example 5, the adhesion was low since in the polymerizable composition r5, the Component B content in terms of active components was lower than 10 wt %.

In Comparative Example 6, the rubbing resistance was low since in the polymerizable composition r6, the Component B content in terms of active components was higher than 30 wt %.

In Comparative Example 7, the antifouling properties and the rubbing resistance were low since the polymerizable composition r7 did not contain Component C.

In Comparative Example 8, the rubbing resistance was low and the reliability was poor since in the polymerizable composition r8, the Component C content in terms of active components was higher than 10 wt %. Also, the transparency of the polymerizable composition r8 was low since Component C was insolubilized.

Additional Remarks

One aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 30 to 80 wt % of a polyfunctional acrylate, 10 to 30 wt % of a monofunctional amide monomer, 0.5 to 10 wt % of a fluorine-based release agent, and 5 to 30 wt % of a vinyl-based polymer containing a repeat unit represented by the following formula (1). This aspect can achieve an antifouling film that is excellent in the antifouling properties, rubbing resistance, and adhesion.

[Chem. 4]

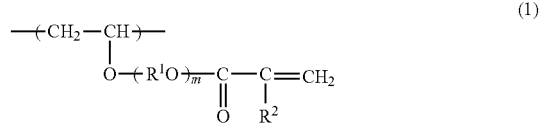

(1)

In the above formula (1), $R^1$ is a C2-C8 alkylene group, $R^2$ is a hydrogen atom or a methyl group, and m is a positive integer.

The vinyl-based polymer may include a polyfunctional polymer containing 50 or more acryloyl groups per molecule. This structure can further increase the crosslinking density of the polymer layer, further increasing the rubbing resistance.

The polyfunctional polymer may be a cationic polymer of 2-(2-vinyloxyethoxy)ethyl acrylate. With this structure, the polyfunctional polymer can be favorably used.

The fluorine-based release agent may contain a perfluoropolyether group. This structure can further increase the antifouling properties and the rubbing resistance as compared with a release agent containing no perfluoropolyether group (e.g., release agent containing a perfluoroalkyl group, silicone-based release agent).

The monofunctional amide monomer may include N,N-dimethylacrylamide. This structure can decrease the viscosity of the monofunctional amide monomer and further increase the compatibility between the polyfunctional acrylate, the fluorine-based release agent, and the vinyl-based polymer. Also, the adhesion can be increased even when the substrate is a triacetyl cellulose film.

The polymer layer may have a surface that shows a contact angle of 130° or greater with water and a contact angle of 30° or greater with hexadecane. This structure further increases the antifouling properties.

The polymer layer may have a thickness of 5.0 μm or greater and 20.0 μm or smaller. This structure distributes fluorine atoms in the fluorine-based release agent on the surface (the surface remote from the substrate) of the polymer layer at a high concentration.

The projections may be formed at an average pitch of 100 nm or longer and 400 nm or shorter. This structure sufficiently prevents optical phenomena such as moiré and iridescence.

The projections may have an average height of 50 nm or greater and 600 nm or smaller. This structure can simultaneously achieve the preferred average height and the preferred average aspect ratio of the projections.

The projections may have an average aspect ratio of 0.8 or greater and 1.5 or smaller. This structure can sufficiently prevent optical phenomena such as moiré and iridescence, and achieve excellent antifouling properties. Also, the structure can sufficiently prevent sticking and deterioration of the transferring conditions in formation of the uneven structure, both being due to decreased processability of the uneven structure.

REFERENCE SIGNS LIST

1: Antifouling film
2: Substrate
3: Polymer layer
4: Projection
5: Polymerizable composition
6: Die
P: Pitch
T: Thickness of polymer layer

The invention claimed is:

1. An antifouling film comprising:
a substrate; and
a polymer layer disposed on a surface of the substrate and including on a surface thereof an uneven structure provided with projections at a pitch not longer than a wavelength of visible light,
the polymer layer being a cured product of a polymerizable composition,
the polymerizable composition containing, in terms of active components, 30 to 80 wt % of a polyfunctional acrylate, 10 to 30 wt % of a monofunctional amide monomer, 0.5 to 10 wt % of a fluorine-based release agent, and 5 to 30 wt % of a vinyl-based polymer containing a repeat unit represented by the following formula (1):

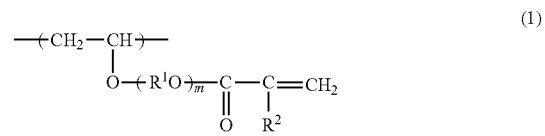

wherein $R^1$ is a C2-C8 alkylene group, $R^2$ is a hydrogen atom or a methyl group, and m is a positive integer, and the fluorine-based release agent includes a perfluoropolyether group.

2. The antifouling film according to claim 1, wherein the vinyl-based polymer includes a polyfunctional polymer containing 50 or more acryloyl groups per molecule.

3. The antifouling film according to claim 2, wherein the polyfunctional polymer is a cationic polymer of 2-(2-vinyloxyethoxy)ethyl acrylate.

4. The antifouling film according to claim 1, wherein the monofunctional amide monomer includes N,N-dimethylacrylamide.

5. The antifouling film according to claim 1, wherein the polymer layer has a surface that shows a contact angle of 130° or greater with water and a contact angle of 30° or greater with hexadecane.

6. The antifouling film according to claim 1, wherein the polymer layer has a thickness of 5.0 μm or greater and 20.0 μm or smaller.

7. The antifouling film according to claim 1, wherein the projections are formed at an average pitch of 100 nm or longer and 400 nm or shorter.

8. The antifouling film according to claim 1, wherein the projections have an average height of 50 nm or greater and 600 nm or smaller.

9. The antifouling film according to claim 1, wherein the projections have an average aspect ratio of 0.8 or greater and 1.5 or smaller.

* * * * *